United States Patent [19]
Yamada

[11] Patent Number: 5,632,198
[45] Date of Patent: May 27, 1997

[54] AUTOMATIC COOKING APPARATUS

[75] Inventor: Yoshimasa Yamada, Mie, Japan

[73] Assignee: Fuji Electric Co., Ltd., Kawasaki, Japan

[21] Appl. No.: 683,258

[22] Filed: Jul. 18, 1996

[30] Foreign Application Priority Data

Jul. 19, 1995 [JP] Japan ................... 7-182390

[51] Int. Cl.$^6$ .............. A21C 9/00; A21C 11/00; A23P 1/00
[52] U.S. Cl. ............... 99/450.6; 99/334; 99/353; 99/450.7; 99/486
[58] Field of Search ............ 99/325–335, 352–355, 99/357, 468, 485, 486, 494, 450.1–450.8; 426/92, 94, 297, 502; 425/376.1, 112, 511, 515, 96; 53/210, 465; 141/158, 168

[56] References Cited

U.S. PATENT DOCUMENTS

| | | | |
|---|---|---|---|
| 3,757,676 | 9/1973 | Pomara, Jr. | 99/450.7 X |
| 3,782,272 | 1/1974 | Cooper | 99/450.7 |
| 3,901,137 | 8/1975 | Jimenez | 99/353 |
| 4,084,493 | 4/1978 | Quintana | 426/297 X |
| 4,393,758 | 7/1983 | Anmahian | 425/511 X |
| 4,483,242 | 11/1984 | Goodman et al. | 53/210 X |
| 4,516,487 | 5/1985 | Madison et al. | 99/450.6 |
| 4,608,919 | 9/1986 | Prows et al. | 99/450.6 |
| 4,638,729 | 1/1987 | Woodworth et al. | 99/450.6 |
| 4,691,627 | 9/1987 | Roberts | 99/450.2 X |
| 5,012,726 | 5/1991 | Fehr et al. | 99/494 X |
| 5,085,138 | 2/1992 | Fehr et al. | 99/450.6 |
| 5,263,407 | 11/1993 | Pomara, Jr. | 99/450.6 |

Primary Examiner—Timothy F. Simone
Attorney, Agent, or Firm—Kanesaka & Takeuchi

[57] ABSTRACT

In the automatic cooking apparatus of the present invention, when a conveyor start signal is received from a master control section, a CPU uses a foodstuff detecting sensor to detect whether a predetermined amount of a foodstuff is stored in a storage and transfer device. If the detecting sensor detects an amount less than the predetermined amount of the foodstuff, the CPU operates a refill section for a predetermined period of time to refill the foodstuff, and then stops this process. When a transfer operation start signal is received from the master control section, the CPU operates a transfer section for a predetermined period of time to supply the foodstuff to a taco on the conveyor. Accordingly, refilling the foodstuff is executed only when the conveyor is started to thereby facilitate the apparatus to operate reliably.

5 Claims, 5 Drawing Sheets

AUTOMATIC COOKING APPARATUS

BACKGROUND OF THE INVENTION AND RELATED ART STATEMENT

The present invention relates to an automatic cooking apparatus including a storage and transfer device for storing and transferring a foodstuff, for example, an apparatus for cooking tacos automatically.

The operation of a conventional automatic cooking apparatus is summarized below with reference to an automatic taco cooking apparatus.

(1) Summary of the cooking operations

FIG. 3 is a schematic view showing the cooking operations of an automatic taco cooking apparatus.

To cook a taco, a tortilla (used as a soft wrapper for the taco) is transferred from a tortilla storage and transfer device 7 and placed onto a conveyor moving toward right in the figure. A taco being cooked on the conveyor is sequentially moved to the transfer position for each storage and transfer device for supplying a foodstuff required for cooking, and the corresponding foodstuff is then supplied from each storage and transfer device. For the tacos shown in the figure, sequentially supplied foodstuffs include minced or ground meat from a minced meat storage and transfer device 10, lettuce from a lettuce storage and transfer device 13, cheese from a cheese storage and transfer device 14, and tomatoes from a tomato storage and transfer device 15. The taco thus cooked is obtained from the right end of the figure as commodities.

Taco shells are stored in a taco shell storage and transfer device 9, and sour cream is stored in a sour cream storage and transfer device 12.

The conveyer does not always move, but rather moves for each foodstuff supply so that tacos can be transferred and stopped at the foodstuff transfer position of each storage and transfer device. When the taco is transferred to the transfer position, the corresponding foodstuff is supplied to the taco.

In addition, the cooking operations, such as moving the conveyor and transferring a foodstuff from the storage and transfer device, are executed by a master control section which controls the overall automatic taco cooking apparatus.

(2) Operations of foodstuff storage and transfer devices

The operations of the foodstuff storage and transfer devices are described with reference to the cheese storage and transfer device.

FIG. 4 schematically shows the operations of the cheese storage and transfer device. FIG. 4 provides not only a conventional example but also one embodiment of the present invention.

The cheese storage and transfer device comprises a storage and transfer section 300a for storing a foodstuff to be transferred, i.e. cheese, a spiral screw 304 for transferring cheese, a refill section 300b for preserving cheese for refilling, and rollers 301 for transferring cheese from the refill section 300b to the storage and transfer section 300a. The spiral screw 304 and the rollers 301 are driven by a motor (not shown).

In addition, to detect whether the storage and transfer section 300a contains a predetermined amount of cheese or not, for example, a foodstuff sensor light emitting section 302 for emitting infrared rays and a foodstuff sensor light receiving section 303 for receiving those infrared rays are installed opposite to each other across cheese in the storage and transfer section 300a.

The motor (not shown) for driving the rollers 301 and the spiral screw 304, the foodstuff sensor light emitting section 302, and the foodstuff sensor light receiving section 303 are connected to the storage and transfer control section. The storage and transfer control section is in turn connected to the master control section described above.

Typically, as described above, when the conveyor moves to transfer a taco being cooked to a position under the spiral screw 304 for transferring cheese, the corresponding foodstuff is transferred. At the same time, when the storage and transfer control section detects, from the foodstuff sensor light receiving section 303, that an amount of cheese stored in the storage and transfer section 300a is less than a predetermined amount, it immediately drives the rollers 301 to refill cheese. Upon detecting that the amount of cheese in the storage and transfer section 300a has reached the predetermined amount via the foodstuff sensor light receiving section 303, the storage and transfer control section stops the driving of the rollers 301, thus completing the refilling operation.

The above conventional automatic cooking apparatus has the following problems.

When the foodstuff sensor light receiving section 303 detects an insufficient quantity of a foodstuff, the rollers 301 immediately operate to refill the foodstuff. That is, the timing for starting the foodstuff refilling operation depends on detection by the foodstuff sensor light receiving section 303, and is not linked with other conditions, such as the position of the taco being moved or waiting on the conveyor, the timing of foodstuff transfer, or other conditions of the cooking apparatus (for example, the opening or closing doors of the chambers of the apparatus). Accordingly, the following inconveniences and action must be considered.

For example, during the transfer of cheese, in case the quantity of the foodstuff becomes insufficient, refilling of the foodstuff is immediately started. Thus, to avoid taco with the insufficient foodstuff, the foodstuff transfer must be once stopped and restarted after refilling is completed. That is, the transfer operation must be restarted after the foodstuff transfer time corresponding to the insufficiency of the foodstuff has been calculated.

Assuming that the conveyor is stopped to await an instruction for supplying the next foodstuff into the taco, in case the amount of cheese in the cheese storage and transfer section 300a becomes less than a predetermined amount, the storage and transfer control section detects this condition from a signal received from the foodstuff sensor light receiving section 303 and drives the rollers 301 to begin refilling. At this moment, if a transfer door for another storage and transfer device is opened to refill the required quantity of the foodstuff, it is necessary to generate an alarm indicating an abnormal condition to avoid danger.

As described above, conventional foodstuff refilling is immediately started simply based on a signal received from the foodstuff sensor light receiving section indicating whether the predetermined amount of foodstuff is present or not, and this operation is not necessarily linked with the operations of the entire apparatus. Consequently, the apparatus must be designed by taking its various operational conditions into consideration, and thereby results in need for a substantial amount of time and labor as well as complicated apparatus control operations.

Furthermore, as described above, since it is not detected prior to transferring of the foodstuff whether the amount of a foodstuff will be insufficient or not during transferring of the foodstuff, this amount must be constantly monitored even during refilling of the foodstuff. As a result, whenever cheese passes through the foodstuff sensor light emitting section and the light receiving section while refilling cheese, the foodstuff sensor light receiving section repeats a signal indicating the sufficiency and a signal indicating the insufficiency of cheese, so that the motor drive section is repeatedly instructed for driving and stopping the rollers 301. The motor drive section, however, can not follow such instructions, and accordingly, the roller drive section fails to operate properly.

It is an objective of the present invention to provide an automatic cooking apparatus that can be designed easily and which can operate reliably.

SUMMARY OF THE INVENTION

According to this invention, an automatic cooking apparatus responds to an instruction received from a master control section to sequentially supply foodstuffs onto a conveyor from storage and transfer means formed of a storage and transfer section for storing and transferring foodstuffs and a refill section for storing foodstuff for refill. The automatic cooking apparatus is provided with foodstuff detection means for detecting a quantity of foodstuffs stored in the storage and transfer section, refilling means for supplying foodstuffs from the refill section into the storage and transfer section, and transfer means for transferring a predetermined amount of the foodstuffs from the storage and transfer section. In the automatic cooking apparatus, the storage and transfer control section is further provided, wherein when a conveyor start instruction is received from the master control section, the storage and transfer control section uses the foodstuff detection means to detect the quantity of the foodstuffs stored in the storage and transfer section; when the detected amount of the foodstuffs is less than the predetermined amount, the storage and transfer control section instructs the refilling means to supply more foodstuffs up to the predetermined amount; and after a transfer start instruction is received from the master control section, the storage and transfer control section instructs the transfer means to transfer the foodstuff.

In this invention, the foodstuff detection means may be formed of an optic sensor and a light source disposed opposite to each other across the foodstuff in the storage and transfer section.

Upon receiving a conveyor start instruction from the master control section, the storage and transfer control section uses the foodstuff detection means to detect a quantity of a foodstuff stored in the storage and transfer section, and when it is determined that the detected amount is less than a predetermined amount, the storage and transfer control section instructs the refilling means to refill the foodstuff up to the predetermined amount. Upon subsequently receiving a transfer start instruction from the master control section, the storage and transfer control section instructs the transfer means to transfer the foodstuff.

Thus, if an amount of a foodstuff becomes insufficient, the corresponding refilling operation is performed only when the conveyor is started, and therefore it never affect the operation of the other devices at other occasions. This enables easy linkage of device operations in the automatic cooking apparatus and reliable operations. Moreover, it facilitates the design of the apparatus.

In addition, an amount of a stored foodstuff is detected at the aforementioned time, but is not detected while refilling of the foodstuff. As a result, the refilling means is prevented from operating improperly due to a false detection resulting from a foodstuff refilling condition. Furthermore, during refilling of the foodstuff, the predetermined amount is refilled instead of detecting that an amount of the foodstuff has reached the predetermined amount, and the refilling is stopped to thereby prevent malfunction due to a false detection. This enables the apparatus to operate reliably.

Furthermore, reliable operation can be facilitated by employing an optic sensor and a light source as the food detection means.

DETAILED DESCRIPTION OF PREFERRED EMBODIMENTS

One embodiment of this invention, which is applied to an automatic taco cooking apparatus, is described below.

(1) Summary of the overall operations of the automatic taco cooking apparatus

Figure 5:
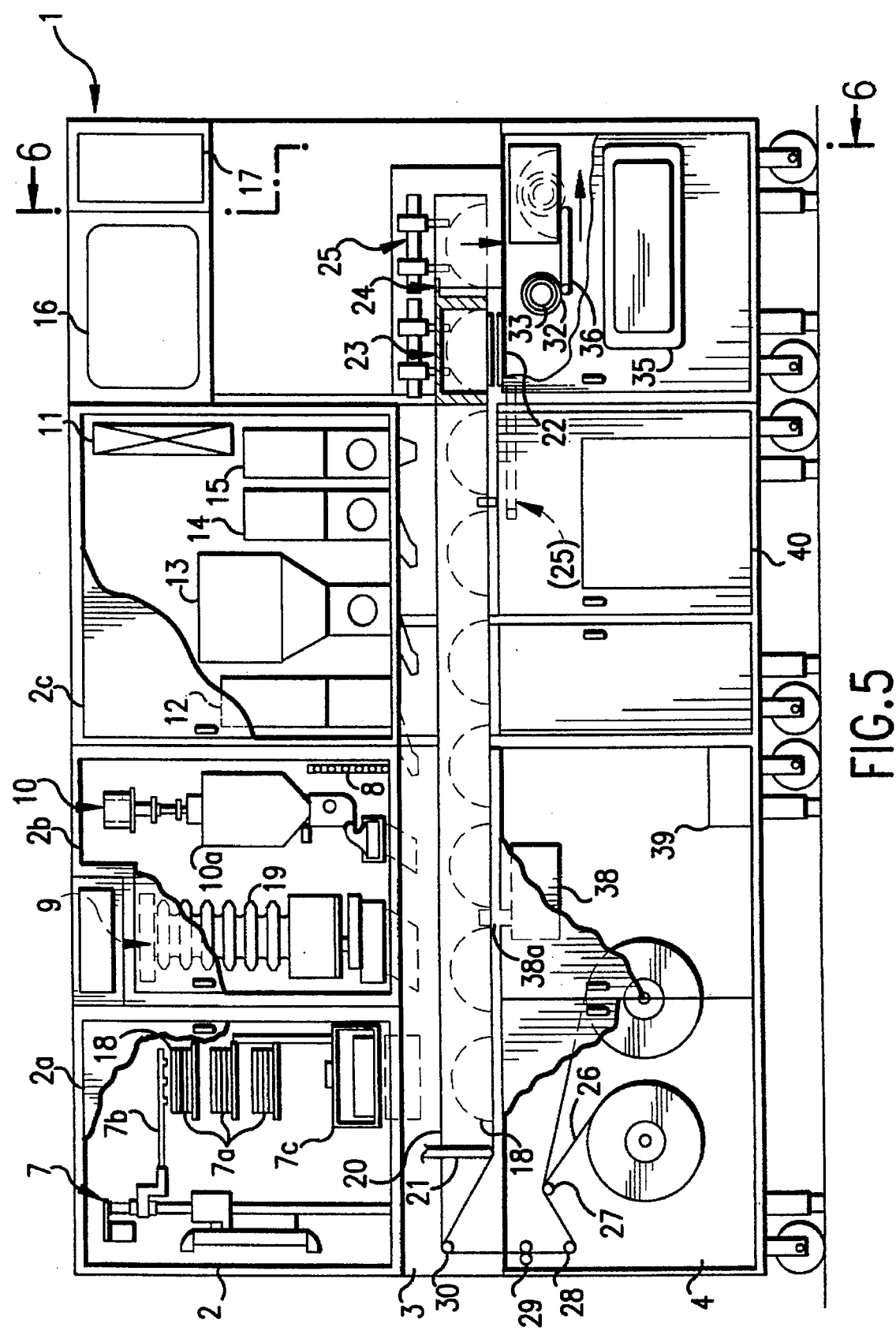
FIG. 5 shows an embodiment of the automatic taco cooking apparatus.
Figure 6:
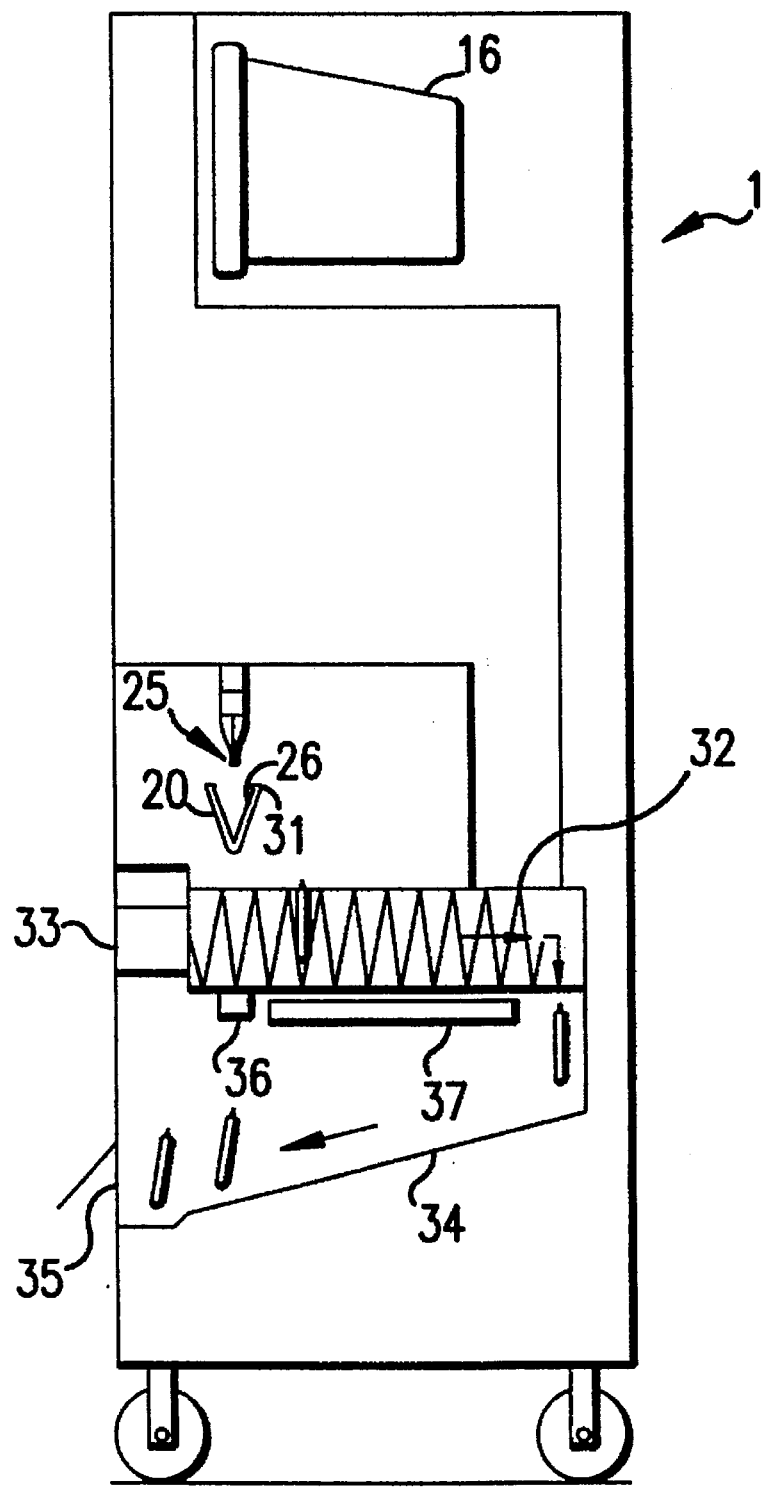
FIG. 6 is a cross-sectional view taken along line 6—6 in FIG. 5.

FIGS. 5 and 6 show an example of an automatic taco cooking apparatus. FIG. 5 is a front view thereof, and FIG. 6 is a cross sectional view taken along line 6—6 in FIG. 5. The structure and operation of each section relating to this invention are summarized below.

The entire automatic cooking apparatus is incorporated in a steel plate cabinet 1. The cabinet 1 is partitioned into a foodstuff housing space 2 in which the store and transfer devices are housed, a cooking space 3 in which tacos are moved on the conveyor after receiving foodstuffs from the respective storage and transfer device, and a utility space 4. The foodstuff housing space 2 is partitioned into several chambers according to the temperature at which the foodstuff must be maintained.

Next, the functions of each section of the apparatus are described below.

The foodstuff housing space 2 is partitioned into three chambers 2a, 2b, and 2c, wherein the chambers 2b and 2c have an adiabatic structure. The chamber 2a is maintained at room temperature, and has a tortilla storage and transfer device 7 installed therein. The chamber 2b is maintained at about 74° C. by a heater 8, and has a taco shell (used as a crisp wrapper for taco) storage and transfer device 9 and a minced meat storage and transfer device 10 installed therein. The chamber 2c is maintained at about 4° C. by a cooler 11, and has a sour cream storage and transfer device 12, a lettuce storage and transfer device 13, a cheese storage and transfer device 14, and a tomato storage and transfer device 15 installed therein. A control chamber is located in the upper right portion of the cabinet adjacent to the chamber 2c, and has an operation display 16 with a touch panel and a main control section 17 installed therein.

The operations of each storage and transfer device are described below.

The tortilla storage and transfer device 7 includes a three-tier shelf 7a on which tortillas 18 that are used as wrappers for the tacos are accumulated and stored. The tortilla 18 is made by forming flour dough, shaping it into a disc having, for example, the diameter of 180 mm and the thickness of 2 mm, and baking the same. To transfer the tortilla 18, a sucker provided at the tip of an arm 7b moved vertically and laterally by a feed screw takes one tortilla at a time and inserts it into the heater 7c. The heater 7c includes horizontal electrothermal plates that are constantly heated and disposed vertically. The inserted tortilla 18 is placed between these electrothermal plates and instantaneously heated. After being heated, the tortilla 18 is allowed to protrude through a lateral slit provided in the middle of the electrothermal plate while being folded in half by having its center line pushed by a vertically-moving plate-like pusher. It then drops vertically through a chute without changing its posture.

The taco shell storage and transfer device 9 includes a large number of shelf boards that are supported horizontally by a spiral wire and fed vertically. About ten taco shells 19 folded in half accumulate on each shelf board in such a way that their folds face the front of the apparatus. The taco shells 19 are made by forming cornmeal dough and shaping the same into discs, which are then baked and fried in oil. Each taco shell has, for example the diameter of about 150 mm and the thickness of about 1 mm.

The minced meat storage and transfer device 10 includes a hopper 10a in which paste-like minced or ground meat is stored and constantly stirred by a stirrer. This minced meat is transferred by a kind of piston pump action. That is, when an air cylinder operates to drive the piston backwards, the valve between the hopper 10a and the cylinder of the piston pump is opened to suck the minced meat into the cylinder. Then, when the piston is driven forward, the same valve is closed and the valve between the cylinder and a discharge port is opened to thereby push the minced meat in the cylinder out of the discharge port.

The sour cream storage and transfer device 12 has yogurt-like sour cream stored in a flexible tube. The sour cream is pushed out of the discharge port by squeezing the tube between motor-driven rollers.

The lettuce storage and transfer device 13 stores shredded lettuce, the cheese storage and transfer device 14 stores cheese, and the tomato storage and transfer device 15 stores tomatoes cut into dice-like pieces. These foodstuffs are transferred by a screw device. That is, horizontal screws are disposed under the corresponding foodstuff tanks so as to extend from the front of the apparatus to its rear. When the screw is rotated by the drive motor, the spiral fin of the screw axially feeds a foodstuff, which is then pushed out of the discharge port.

Next, the cooking space 3 is described.

A gutter-like wrapping paper guide 20 made of stainless steel having a V-shaped cross section (referring to FIG. 6) is horizontally installed in the front of the cooking space 3. A round rod 21 with the diameter of about 10 mm is vertically installed at a wrapping paper inlet (at the left end of FIG. 5) to fold wrapping paper into a V-shape. The tip of the rod 21 is spherical, and is disposed to face the bottom of the wrapping paper guide 20 at a distance of about 0.1 mm.

A slab-like receiving plate 22 is installed adjacent to the wrapping paper outlet (the right end of FIG. 1) of the wrapping paper guide 20 at the same level as the bottom surface of the wrapping paper guide 20. A wrapping paper sealing device 23 is installed over the receiving plate 22. A wrapping paper cutting device 24 (shown by a chain line) is installed adjacent to the wrapping paper sealing device 23. A wrapping paper feeding device 25 is installed over the devices 23 and 24, and is laterally moved back and forth between the chain line position and the solid line position by an air cylinder.

Rolls of tape-like wrapping paper 26 are rotatably supported at the left end of the utility space 4 in FIG. 5. The wrapping paper 26 is, for example, first-class rice paper of 260 mm in width and 45 μm in thickness, and a pressure-sensitive adhesive has been applied to the entire surface of the paper corresponding to the outer surface of the roll so that the paper can adhere to a target object when pressed. The wrapping paper 26 is wound around guide rollers 27 and 28, passes between feed rollers 29, and is wound around a guide roller 30 to be guided into a V-shaped space in a wrapping paper guide 20. The wrapping paper 26 remains flat until it leaves the guide roller 30. Then, the wrapping paper 26 is gradually deformed along its center line so as to be V-shaped, and after entering the wrapping paper guide 20, it is folded along its section, passes through the gap between the rod 21 and the bottom surface of the wrapping paper guide 20, and reaches the right end of the wrapping paper guide 20. Two rolls of wrapping paper are disposed in parallel so that as soon as one of them is used up, it is switched to the other roll.

Folding the wrapping paper 26 and introducing the paper into the wrapping paper guide 20 are manually carried out before starting operation of the apparatus. That is, after the wrapping paper 26 is wound around the guide roller 30, the tip of the wrapping paper 26 is shaped by fingers to be deformed in a V-shape, slid under the rod 21 to be introduced into the wrapping paper guide 20, and pulled to the right until its tip overlaps the seal mechanism 23. In the meantime, the wrapping paper 26 is pushed along its center line by the tip of the rod 21, and passes through the wrapping paper guide 20 while being folded so as to be V-shaped along the inner wall surface of the wrapping paper guide 20. The right and left upper end surfaces of the wrapping paper 26 folded in a V-shape are located slightly lower than the wrapping paper guide 20, but U-shaped caps 31 are mounted at the right and left upper ends of the wrapping paper guide 20 to prevent the wrapping paper from slipping out of the guide, as shown in FIG. 6.

At the right end of the utility space 4, for example, right and left spiral wires 32 are horizontally disposed so as to extend in the front and back directions of the apparatus, and each of the wires is rotatably driven by a motor 33 (FIG. 6). As shown in FIG. 6, the front side of the spiral wire 32 is disposed under the wrapping paper guide 20, while its rear side is disposed over a chuter 34 inclined toward the front of the apparatus. The chuter 34 leads to an outlet 35 with a flapper which opens into the front direction of the apparatus.

A narrow belt conveyor 36 is laterally and horizontally installed to extend over both the right and left spiral wires 32, and a receiving plate 37 is horizontally installed behind the belt conveyor near the lower surface of the spiral wire 32 so as to extend from the front of the apparatus to its rear. A lower seal mechanism 38, a terminal control section 39, and a refrigerator unit 40 for supplying refrigerants to the cooler 11 are also housed in the utility space 4.

(2) Foodstuff storage and transfer device

Figure 4:
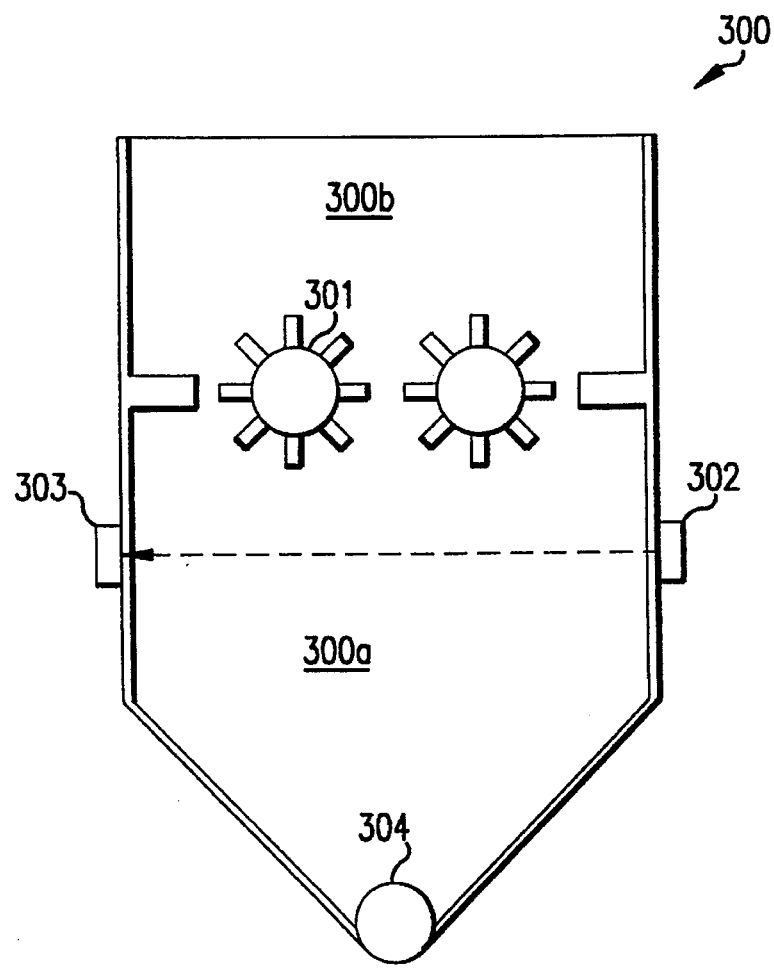
FIG. 4 shows an embodiment of a cheese storage and transfer device according to the present invention.

According to the invention, the structure of the foodstuff storage and transfer device is similar to the one in FIG. 4 showing a conventional example, but its operational timing is different as described below.

Figure 1:
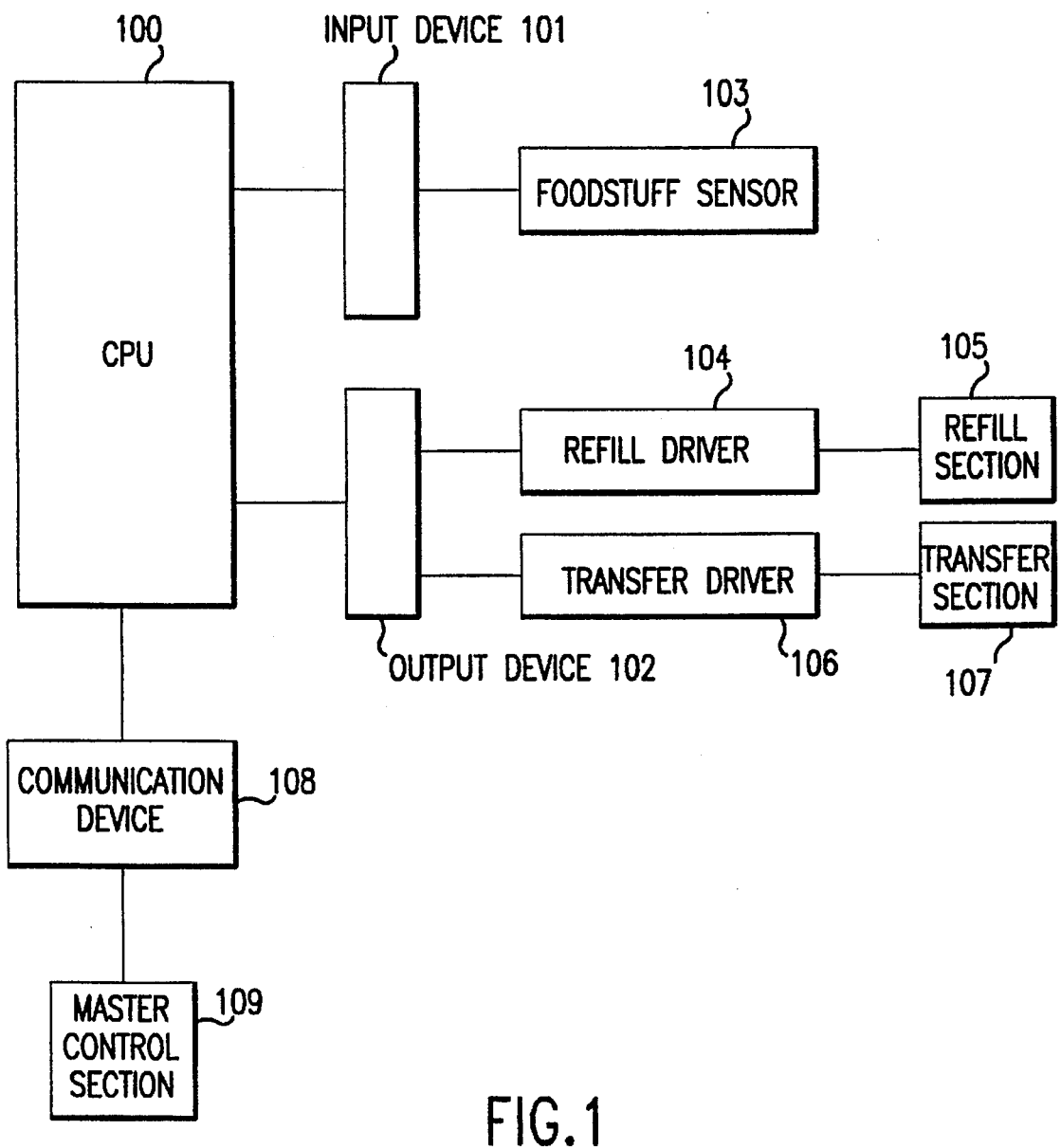
FIG. 1 is a block diagram showing a structure of an automatic cooking apparatus according to an embodiment of the present invention.

FIG. 1 is a block diagram showing one embodiment of the invention. Although this embodiment uses cheese as the foodstuff, the operation is similar for other foodstuffs.

Reference numeral 100 designates a CPU that controls the overall apparatus and to which the following equipment is connected.

Reference numeral 103 denotes a foodstuff sensor for detecting an amount of cheese stored in a storage and transfer section 300a in a foodstuff stocker 300 (FIG. 4) in the cheese storage and transfer device 14. The foodstuff sensor transmits a signal for adding cheese to the CPU 100 via an input device 101 when the amount of cheese becomes less than a predetermined amount. The foodstuff sensor 103 comprises a foodstuff sensor light emitting section 302 for providing infrared rays and a foodstuff sensor light receiving section 303 for receiving such infrared rays, as described before.

Reference numeral 105 indicates a refill section including a roller 301 that is rotated when cheese is refilled from a refill section 300b in the cheese storage and transfer device 14 to a storage and transfer section 300a, and upon receiving drive instruction from the CPU 100 via an output device 102 and a refill driver 104, it drives the roller 301 to refill cheese.

Reference numeral 107 denotes a transfer section including a spiral screw 304 in the cheese storage and transfer device 14, and upon receiving transfer instruction from the CPU 100 via the output device 102 and a transfer driver 106, it drives the spiral screw 304 to transfer cheese.

Reference numeral 109 is a master control section for providing instructions to each section and device of the automatic taco cooking apparatus, and it instructs the CPU 100 via a communication device 108 to operate the relevant device.

(3) Operations of the main parts of the invention

Figure 2:
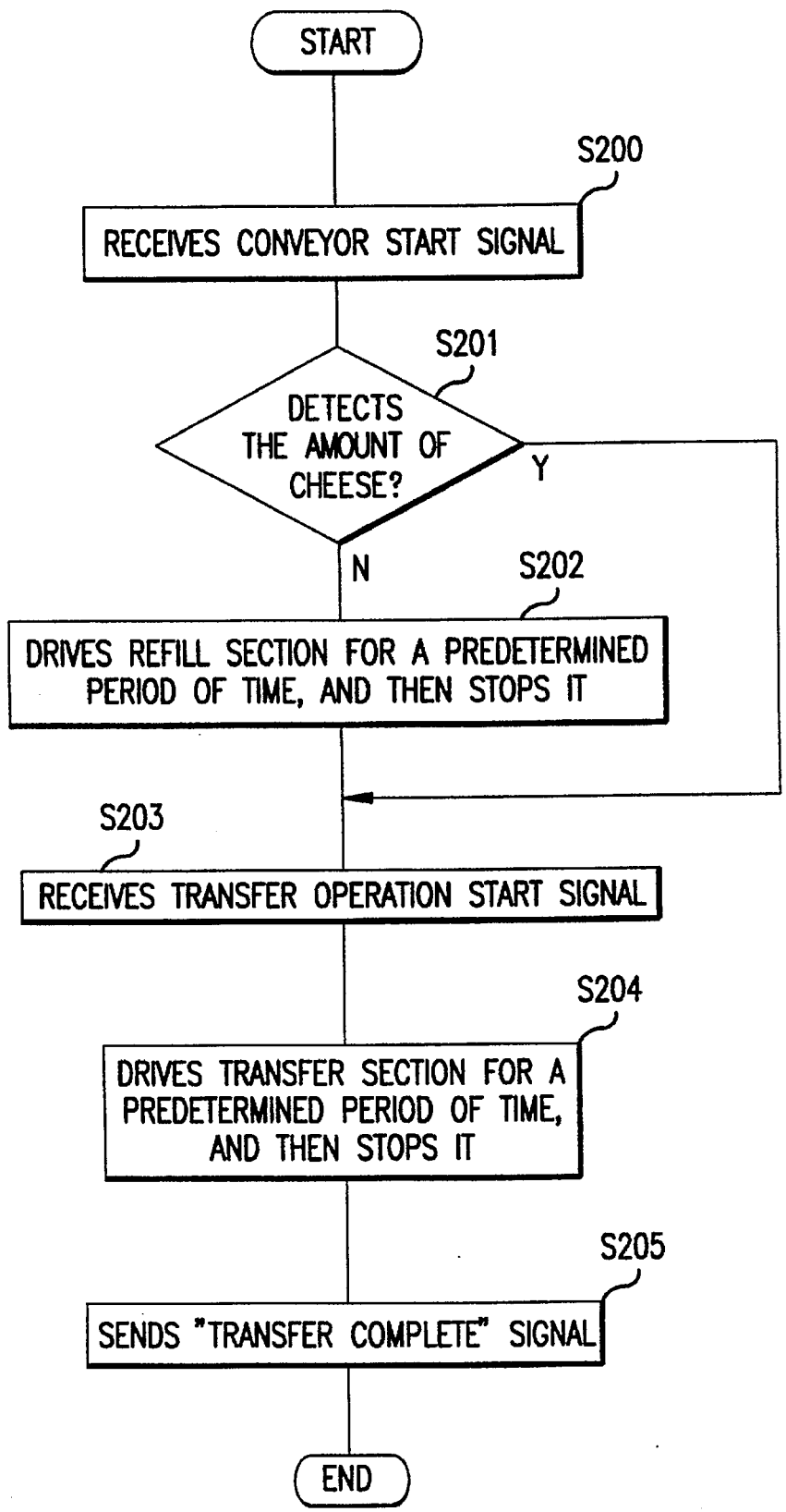
FIG. 2 is a flow chart showing operations according to the present invention in FIG. 1.
Figure 3:
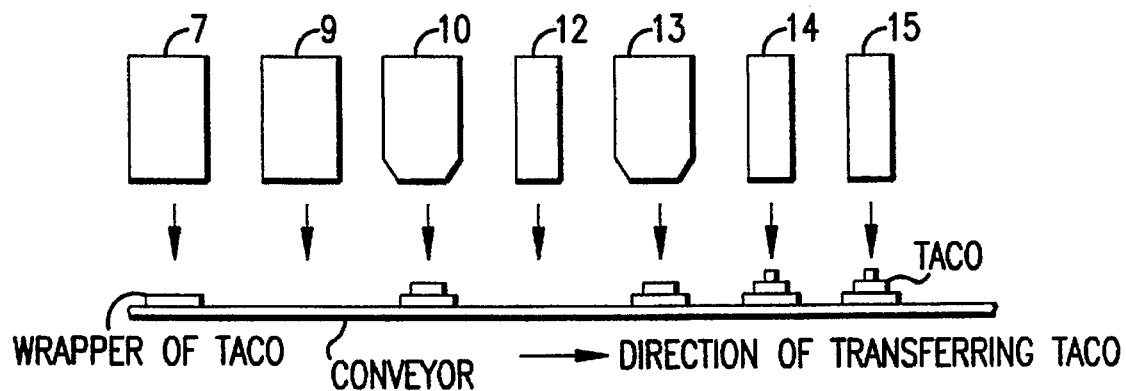
FIG. 3 schematically shows cooking operations of an automatic taco cooking apparatus according to the present invention.

FIG. 2 is a flow chart showing the operation of the main parts of the invention. The operation is described below with reference to FIG. 1.

The master control section 109 issues a conveyor start signal to supply a next foodstuff to a taco being cooked. When receiving this signal through the communication device 108 (step S200), the CPU 100 detects a signal from the foodstuff sensor 103 through an input device 101 to detect whether the predetermined amount of the next foodstuff (cheese in this embodiment) is stored in the storage and transfer device (step S201). If so (branch Y), the process proceeds to step S203, and if not (branch N), the roller 301 in the refill section is driven for a predetermined period of time and stopped to refill cheese (step S202), and the process moves to step S203.

In step S203, when receiving a transfer operation start signal from the master control section 109, the CPU 100 drives the spiral screw 304 (FIG. 4) for a predetermined period of time to supply the relevant foodstuff to the taco (step S204).

After transferring or supplying the foodstuff, the CPU 100 transmits a transfer complete signal to the master control section 109 via the communication device 108 (step S205) to finish the series of operations.

Due to the above operations, if the amount of the foodstuff becomes insufficient, the corresponding refilling operation is performed only during the start-up of the conveyor, and never affects the operations of the other devices during other periods of time. This enables the overall automatic cooking apparatus to operate more smoothly, and also enables the apparatus to have a simpler design.

In addition, detecting the amount of the foodstuff stored never occurs during refilling of the foodstuff, so the refill device is prevented from operating improperly due to a false detection caused in the refilling condition. Furthermore, during refilling of the foodstuff, a predetermined amount of the foodstuff is refilled to thereby prevent a malfunction due to false detection. This enables the apparatus to operate reliably.

Furthermore, reliable operations can be facilitated by employing an optic sensor and a light source as the foodstuff detecting means.

According to the invention, since detecting the amount of the foodstuff and refilling the foodstuff are carried out only when the conveyor is started, during the periods other than the start-up of the conveyor, it is not required to consider the period and condition in detecting and refilling the foodstuffs. This enables the system to be designed easily and the apparatus to operate reliably. In addition, no foodstuff detection is executed during refilling of the foodstuffs to thereby prevent the malfunction of the detection means and the resulting improper operation of the transfer means.

Furthermore, the use of an optical sensor as the foodstuff detection means enables foodstuffs to be detected more easily and the apparatus to operate reliably.

What is claimed is:

1. An automatic cooking apparatus, comprising:

a storage and transfer device formed of a storage and transfer section for storing and transferring a foodstuff and a refill section for storing the foodstuff for refilling, a conveyor disposed under the storage and transfer device, a master control section connected to the storage and transfer device and the conveyor for controlling the automatic cooking apparatus;

foodstuff detection means attached to the storage and transfer section for detecting a quantity of the foodstuff stored in the storage and transfer section, refilling means attached to the refill section for supplying the foodstuff for refilling from the refill section to the storage and transfer section, transfer means attached to the storage and transfer section for transferring a predetermined amount of the foodstuff from the storage and transfer section onto the conveyor; and a storage and transfer control section connected to the master control section, said storage and transfer control section actuating the foodstuff detection means to detect a quantity of the foodstuff stored in the storage and transfer section when an instruction for starting the conveyor is received from the master control section, said storage and transfer control section instructing the refilling means to supply a predetermined amount of the foodstuff from the refill section to the storage and transfer section for refilling when an amount detected by the foodstuff detection means is less than a predetermined amount of the foodstuff in the storage and transfer section, and then, said storage and transfer control section instructing the transfer means to transfer the foodstuff when an instruction for starting to transfer the foodstuff is received from the master control section.

2. An automatic cooking apparatus according to claim 1, wherein said foodstuff detection means is formed of an optic sensor and a light source, said optic sensor and the light source being disposed opposite to each other across the foodstuff in the storage and transfer section.

3. An automatic cooking apparatus according to claim 1, wherein said foodstuff detection means actuates only when the master control section outputs the instruction for starting the conveyor.

4. An automatic cooking apparatus according to claim 1, wherein a taco is placed on the conveyor, said transfer means being actuated when the taco on the conveyor stops under the storage and transfer section.

5. An automatic cooking apparatus according to claim 1, wherein said cooking apparatus includes a plurality of said foodstuff storage and transfer devices for supplying different foodstuffs to the taco, each foodstuff storage and transfer device having the storage and transfer section for a different foodstuff, the refill section, the foodstuff detection means attached to the storage and transfer section, the refilling means attached to the refill section, and the transfer means attached to the storage and transfer section for transferring a predetermined amount of the different foodstuff from the storage and transfer section to the taco on the conveyor.

* * * * *

UNITED STATES PATENT AND TRADEMARK OFFICE
CERTIFICATE OF CORRECTION

PATENT NO. : 5,632,198
DATED : May 27, 1997
INVENTOR(S) : Yoshimasa Yamada

It is certified that error appears in the above-indentified patent and that said Letters Patent is hereby corrected as shown below:

In column 5, line 63, change "1" to --5--.

Signed and Sealed this

Eleventh Day of November, 1997

*Attest:*

BRUCE LEHMAN

*Attesting Officer*  *Commissioner of Patents and Trademarks*